(12) United States Patent
Voelker et al.

(10) Patent No.: US 9,939,110 B2
(45) Date of Patent: *Apr. 10, 2018

(54) TRANSPORT OF NATURAL GAS THROUGH SOLUTION IN LIQUID HYDROCARBON AT AMBIENT TEMPERATURE

(71) Applicants: Joseph J. Voelker, Aurora, CO (US); Curtis Hays Whitson, Trondheim (NO)

(72) Inventors: Joseph J. Voelker, Aurora, CO (US); Curtis Hays Whitson, Trondheim (NO)

(*) Notice: Subject to any disclaimer, the term of this patent is extended or adjusted under 35 U.S.C. 154(b) by 0 days.

This patent is subject to a terminal disclaimer.

(21) Appl. No.: 15/783,579

(22) Filed: Oct. 13, 2017

(65) Prior Publication Data

US 2018/0038549 A1    Feb. 8, 2018

Related U.S. Application Data

(63) Continuation of application No. 15/557,563, filed as application No. PCT/US2016/022143 on Mar. 11, 2016.

(60) Provisional application No. 62/133,262, filed on Mar. 13, 2015.

(51) Int. Cl.
| | |
|---|---|
| F17C 11/00 | (2006.01) |
| B01D 19/00 | (2006.01) |
| B01D 53/26 | (2006.01) |
| F17C 1/00 | (2006.01) |
| F17C 5/00 | (2006.01) |
| F17C 7/00 | (2006.01) |
| C10L 3/10 | (2006.01) |

(52) U.S. Cl.
CPC ........ *F17C 11/007* (2013.01); *B01D 19/0036* (2013.01); *B01D 53/26* (2013.01); *C10L 3/10* (2013.01); *F17C 1/002* (2013.01); *F17C 5/00* (2013.01); *F17C 7/00* (2013.01); *C10L 2290/24* (2013.01); *C10L 2290/54* (2013.01); *F17C 2201/0109* (2013.01); *F17C 2201/035* (2013.01); *F17C 2221/033* (2013.01); *F17C 2223/0123* (2013.01); *F17C 2223/036* (2013.01); *F17C 2225/013* (2013.01); *F17C 2225/036* (2013.01); *F17C 2265/061* (2013.01); *F17C 2270/0105* (2013.01)

(58) Field of Classification Search
CPC ........ F17C 2221/033; F17C 2270/0105; F17C 7/02; F17C 11/007; F17C 2221/03; F17C 2221/032; F17C 2223/013; F17C 2223/035; F17C 2265/015; F17C 2265/025

See application file for complete search history.

(56) References Cited

U.S. PATENT DOCUMENTS

| | | | |
|---|---|---|---|
| 2,933,902 A | 4/1960 | Howard | |
| 3,068,657 A | 12/1962 | Allen | |
| 3,213,632 A | 10/1965 | Valk et al. | |
| 3,246,480 A | 4/1966 | Rigby | |
| 3,670,752 A | 6/1972 | Marsden et al. | |
| 4,010,622 A | 3/1977 | Etter | |
| 4,027,688 A | 6/1977 | Gruber et al. | |
| 4,243,493 A | 1/1981 | Gruber et al. | |
| 4,446,804 A | 5/1984 | Kristiansen et al. | |
| 5,315,054 A | 5/1994 | Teel | |
| 5,433,889 A | 7/1995 | Lenglen | |
| 5,900,515 A | 5/1999 | Mallinson et al. | |
| 5,941,096 A | 8/1999 | Gudmundsson | |
| 6,449,961 B1 * | 9/2002 | Korsgaard | E21B 43/01 62/240 |
| 6,584,780 B2 | 7/2003 | Hibino et al. | |
| 7,418,822 B2 | 9/2008 | Perry | |
| 8,225,617 B2 | 7/2012 | Morris | |
| 8,381,544 B2 | 2/2013 | Coyle | |
| 9,625,098 B2 * | 4/2017 | Voelker | F17C 7/02 |
| 2006/0042273 A1 | 3/2006 | Morris et al. | |
| 2008/0287726 A1 | 11/2008 | Holman | |

OTHER PUBLICATIONS

Ibironke et al., "A probabilistic economic analysis of the transportation of GTL blends through TAPS", Energy Sources, Part B, 6:12-19, 2011.
Thomas et al., "Review of ways to transport natural gas energy from countries which do not need the gas for domestic use", Energy, vol. 28, 2003, pp. 1461-1477.
International Search Report in the parent PCT application No. PCT/US2016/022143, dated Jun. 3, 2016.
Written Opinion in the parent PCT application No. PCT/US2016/022143, dated Jun. 3, 2016.

* cited by examiner

*Primary Examiner* — Sharon Pregler
(74) *Attorney, Agent, or Firm* — Chen Yoshimura LLP

(57) ABSTRACT

A method of transporting natural gas by liquefaction of natural gas at ambient temperature, achieved by mixing the natural gas at high pressure with a hydrocarbon that is a stable liquid at ambient temperature and ambient pressure. The hydrocarbon liquid may be crude oil or a distillate of crude oil. The method includes: liquefaction: mixing the natural gas with the hydrocarbon liquid at an ambient temperature and a high pressure to generate a liquid mixture, which contains the natural gas dissolved in the hydrocarbon liquid; shipping: transporting the liquid mixture using a marine tanker, during which the liquid mixture is maintained at ambient temperature and the high pressure; and regasification: at the destination, releasing a gas from the liquid mixture by lowering the pressure of the liquid mixture. The hydrocarbon liquid may be used multiple times.

19 Claims, 4 Drawing Sheets

TRANSPORT OF NATURAL GAS THROUGH SOLUTION IN LIQUID HYDROCARBON AT AMBIENT TEMPERATURE

BACKGROUND OF THE INVENTION

Field of the Invention

This invention relates to transportation of natural gas, and in particular, it relates to a process of transporting natural gas through solution in liquid hydrocarbon.

Description of the Related Art

The supply of U.S. natural gas is growing at such a rate from so-called unconventional or "shale gas" production, as to eventually warrant U.S. natural gas export. The U.S. presently does not export natural gas offshore, although offshore export of natural gas is an established industry outside of the U.S. 10% of global natural gas production in 2014 was transported via maritime transport, as liquefied natural gas, LNG. Dominant export countries such as Qatar, Malaysia, Indonesia, Nigeria, and Australia, possess large natural gas fields that produce volumes greatly exceeding domestic demand. Natural gas import markets via maritime transport are predominantly in Japan, China, South Korea, India, and Taiwan.

The condition in which U.S. domestic supply exceeds demand is beginning to arise. U.S. natural gas production and consumption dominate global data: in 2014 the U.S. balanced production and consumption at 22% of global totals. Only two other countries, China and Russia, accounted for more than 5% of global production or consumption. A U.S. natural gas oversupply condition may therefore potentially add substantial volumes to international natural gas markets.

Offshore marine transport of U.S. natural gas is therefore being undertaken by U.S. industry and government. Improving the economic efficiency of marine transport of U.S. natural gas is therefore an important effort. This invention contributes to that effort.

Onshore transportation of natural gas occurs almost exclusively by pipeline. Natural gas is not transported by pipeline across large expanses of water however, due to prohibitive pipeline and facilities material and installation cost. Trans-ocean export of natural gas therefore occurs exclusively in discrete shipments by marine vessels.

Pipeline transport is comprised of flowing the gas in a continuous stream from a high-pressure point of origin to a lower pressure point of sales. Over land, flowing a continuous stream through a pipeline is significantly more cost effective than transporting the gas in discrete shipments by tanker truck or rail.

Discrete transport (marine vessel, rail, or tanker truck) is more appropriate for hydrocarbon liquid than for natural gas, because a unit volume of liquid hydrocarbon such as crude oil, gasoline, diesel, or kerosene contains a significantly larger quantity of energy than that of natural gas. To illustrate, at atmospheric pressure and ambient temperature, a similar heating value is contained in 1 cubic foot of crude oil, as in 1000 cubic feet of natural gas. Therefore, 1000 discrete shipments of natural gas at ambient conditions must occur to transport an equivalent energy quantity as 1 similar shipment of crude oil.

Feasible discrete shipping of natural gas therefore requires that a given gas heating value occupy a much smaller volume than that at ambient conditions—its density must be increased. This is presently commercially accomplished at ambient pressure by lowering the temperature of the gas sufficiently that it becomes liquid, or compressing the gas at ambient temperature with sufficient pressure such that although it remains in gaseous form, it occupies a significantly smaller volume. These are presently the two fundamental physical approaches employed to produce Liquefied Natural Gas—LNG, and Compressed Natural Gas—CNG, respectively, for discrete transportation of natural gas.

Presently, LNG is a commercially feasible method of marine transportation of natural gas. CNG to date has not been a commercially viable marine transportation option, despite numerous proposed projects in the previous 50 years.

SUMMARY OF THE INVENTION

This invention provides an alternative to the two prevailing concepts for the offshore transportation of natural gas, LNG and CNG.

The alternative process is a liquefaction of natural gas at ambient temperature, achieved by mixing the natural gas at high pressure with a hydrocarbon mixture that is liquid at ambient temperature and ambient pressure. Crude oil is the most prevalent and perhaps most appropriate hydrocarbon mixture that is liquid at ambient conditions. However, other sufficient hydrocarbon mixtures may include distilled products of crude oil which are liquid at ambient conditions.

According to embodiments of this invention, the natural gas to be transported is mixed with a hydrocarbon liquid stock at ambient temperature, and at pressures exceeding atmospheric pressure, for which the gas phase becomes a liquid phase through natural and well-known hydrocarbon gas-liquid phase equilibria phenomena. As the gas is "dissolved" in the crude oil liquid, borrowing from the lexicon in the petroleum engineering canon, within which natural gas—crude oil phase equilibria has historically been most extensively studied, the mixed transport liquid state is appropriately named Dissolved Natural Gas, or DNG.

The hydrocarbon liquid with which the natural gas to be transported is mixed, will be referred to as Liquid Hydrocarbon, "LH", in the remainder of this application. LH is liquid at ambient temperature and pressure. Examples of LH include any crude oil, and any distilled derivative of crude oil that is liquid at ambient conditions, such as gasoline, kerosene, jet fuel, diesel, fuel oil, or liquids used to formulate non-aqueous drilling liquids in the oil and gas well drilling industry.

DNG is a liquid, comprised of LH mixed with the natural gas, liquefied, to be transported. DNG exists, and is transported, at ambient temperature and elevated pressure. Feasible DNG pressures are high relative to current marine vessel pressure ratings—they may approach 3500 psig. New marine vessel design and construction for safe transportation of high-pressure liquid will therefore be required to achieve DNG feasibility.

The liquefied natural gas is re-gasified at the transport destination point at ambient temperature, by releasing the elevated pressure to ambient pressure.

The DNG process differs fundamentally from the two prevailing marine transport concepts, LNG and CNG. LNG is a liquid, by liquefaction of natural gas at atmospheric pressure and cryogenic temperature. CNG is a gas, by compression of natural gas at elevated pressure and ambient temperature. DNG is a liquid, by solution of natural gas in LH, at elevated pressure and ambient temperature.

The DNG process also differs from the two prevailing concepts in that the DNG gas that is re-gasified is not necessarily the same gas that is liquefied. Mixing with LH changes the natural gas composition, the degree to which depends on the separate LH and natural gas compositions. LNG and CNG gases that are distributed at the destination port are the same as that which entered the marine vessel—the LNG and CNG processes do not change the transported natural gas composition.

Although LNG occupies a significantly smaller (~⅓) volume than DNG, the process according to embodiments of this invention has a potentially significant cost advantage over the LNG process because it occurs at ambient temperature, therefore not requiring cryogenic and refrigeration equipment and power.

DNG will also not require as extensive conditioning of natural gas as for LNG, that is, the removal of acid gases carbon dioxide and hydrogen sulfide, removal of nitrogen and mercury, and dehydration. This prior LNG conditioning is necessary to meet product specifications, avoid corrosion, and avoid equipment plugging, as carbon dioxide and water would freeze to a solid during cryogenic liquefaction, possibly resulting in plugging and associated safety hazards and equipment damage. The DNG process may require dehydration and removal of hydrogen sulfide to minimize corrosion, but other conditioning processes may not be necessary.

DNG will not require the hydrocarbon fractionation necessary for LNG. Hydrocarbon fractions heavier than propane must be significantly reduced for LNG because their freezing points are higher than the liquefaction temperature for methane, ethane or propane. The formation of solid frozen hydrocarbon must be avoided during the LNG process to avoid plugging and associated safety hazards and equipment damage.

The equipment and process required for natural gas conditioning and fractionation comprises a significant portion, ~10%, of the total capital and operating cost of an LNG project.

All components of raw natural gas, including impurities, are dissolvable in LH. The DNG process will therefore not require conditioning or fractionation, and associated equipment.

Relatively low cost compression equipment, standard in oil field operations, may be used to prepare DNG at the loading port, and relatively low cost separation equipment, also standard in oilfield operations, may be used for regasification at the destination port.

The invention is similar to the CNG process in volume reduction, however it fundamentally differs in that CNG is gas, and DNG is liquid. It is anticipated that if DNG differentiates commercially from CNG, it will be predominantly because DNG is liquid. If technological and safety developments are advanced in liquid shipping container capability, specifically the cost efficient construction of large, high-pressure marine vessels, and if these vessels provide technical, safety, environmental, and economic advantages in liquid transport over gas transport, the DNG process may achieve higher commerciality than CNG.

Two DNG transport paradigms may be implemented. First, a cargo of LH may be mixed with the natural gas to be transported, to form DNG at the loading port, with such LH cargo used in multiple DNG trans-ocean trips. The natural gas dissolved in the LH during each trip may be re-gasified for distribution at the destination port. The LH may remain on the ship, to be transported back to the loading port to be mixed with another volume of natural gas intended for trans-ocean transport. The crude may be sold at any time, at market value.

Alternatively, the LH may be released and sold along with the re-gasified natural gas at the destination port, upon first arrival, and would not be used in multiple trips. The ship may then return to a loading port empty, take on new LH cargo, which may subsequently be mixed with a volume of natural gas intended for trans-ocean transport.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a process of transporting natural gas, which includes: providing a hydrocarbon liquid at ambient temperatures and ambient pressures, and mixing the natural gas with the hydrocarbon liquid at an ambient temperature and a high pressure to generate a liquid mixture, the liquid mixture containing the natural gas dissolved in the hydrocarbon liquid; transporting the liquid mixture using a marine tanker from a first location to a second location, wherein the liquid mixture is maintained at ambient temperature and the high pressure; and at the second location, releasing a gas from the liquid mixture by lowering a pressure of the liquid mixture.

It is to be understood that both the foregoing general description and the following detailed description are exemplary and explanatory and are intended to provide further explanation of the invention as claimed.

DETAILED DESCRIPTION OF THE PREFERRED EMBODIMENTS

Figure 1:
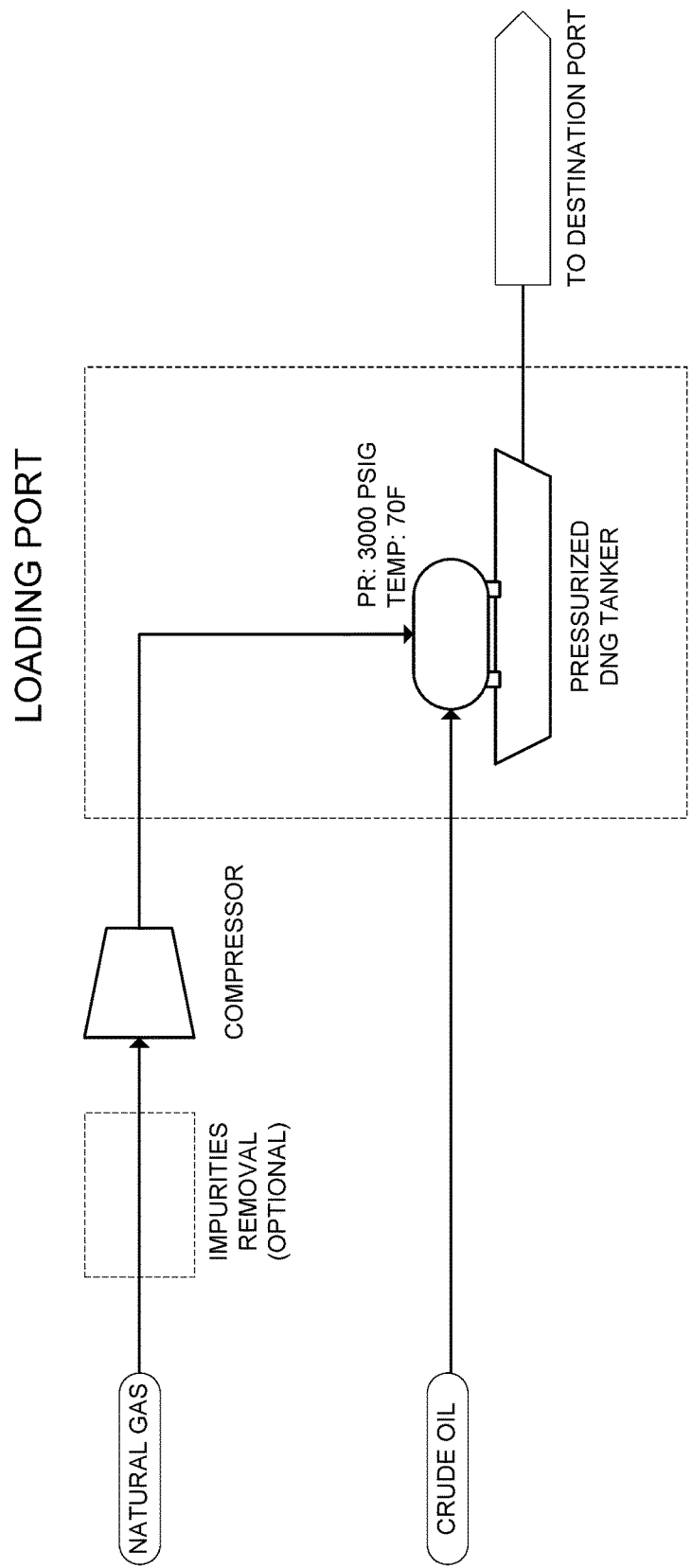
FIG. 1 schematically illustrates the process and equipment of mixing of natural gas and LH in a DNG tanker according to an embodiment of the present invention.

Embodiments of this invention use a fundamental physical property of any natural gas—that it can be in gas-liquid phase equilibrium with any LH, at any temperature.

That is, when a volume of any natural gas at for example, ambient temperature, is mixed with any LH and pressurized sufficiently, the natural gas becomes a liquid, a component of the LH. A "swelling" of the LH volume occurs as the gas phase becomes liquid. Although the LH has swelled, it does not contain a free gas phase—it is 100% liquid, at ambient temperature.

Additional volumes of the natural gas that are mixed with the LH will also become liquid, with sufficient further pressurization, and critically, at ambient temperature. Continued addition of gas into the LH and increase in pressure will eventually result in the mixture becoming a gas. This point of gasification may be reliably predicted and avoided however, as the compositions of the LH and natural gas are known, and the phase equilibrium phenomenon is well understood and reliably predicted.

Crude Oil—The Universal Carrying Medium of Natural Gas

A technically and economically optimal LH is crude oil, given its low cost and prevalence relative to LH alternatives, that is the distilled products of crude oil. The processed distillates of crude oil are more expensive than crude oil and less prevalent, geographically as they must originate from refineries, and practically as they generally have established, dedicated markets.

Crude oil is a naturally occurring hydrocarbon mixture that is a liquid at ambient conditions, that originated as a fluid, called petroleum, that resided in a subterranean reservoir. Petroleum formed from ancient organic matter at elevated pressure and temperature, through natural processes known as diagenesis and cracking, occurring over periods measured in geologic time.

In the petroleum engineering lexicon, natural gas is indicated to be "soluble" in crude oil. It "dissolves", or liquefies, into the crude oil with elevated pressure. Such "solubility" is an exhaustively studied phenomenon in the petroleum engineering canon.

Natural gas and crude oil are universally soluble, no matter the compositions or subterranean origins of either. Any natural gas of any composition, from any gas field, is soluble in any crude oil from any oil field. A natural gas produced in Texas is soluble in a crude oil produced in Saudi Arabia. This is true despite the fact that there are no two identical crude oil compositions. Every crude oil is as unique as a fingerprint, yet all can be in phase equilibrium with any natural gas.

All crude oils and natural gases share hydrocarbon components. Natural gas is predominantly methane, ethane, propane, butane, pentane, and smaller amounts of hexane and heptane. All natural gases are comprised of at least methane, and generally some, but not necessarily all, of the other hydrocarbons ethane-heptane. Methane is the "lightest" component, and heptane is typically the "heaviest" component in a natural gas, ranked according to molecular weight, smaller (light) to larger (heavy).

All crude oils contain some or all of these few primary gaseous components, and many more, heavier hydrocarbon components.

Each of these components achieves a gas/liquid phase equilibrium, no matter their relative amounts in either the natural gas or crude oil being mixed.

The entirety of components of a natural gas need not be present in the crude oil, or general LH, to be liquefied. For example, an LH comprised of a crude oil that does not contain methane, may still liquefy a natural gas that is pure methane. Similarly, the methane gas may be liquefied in gasoline, which does not contain methane.

Natural gas in fact is soluble in any liquid, hydrocarbon or not. However, the mass of natural gas that may be dissolved, at a given elevated pressure, is maximum when the liquid is LH.

Natural gas impurities, that is, non-hydrocarbon components, the most common of which are nitrogen, carbon dioxide, and hydrogen sulfide, also generally occur in crude oil, and therefore appreciable concentrations of these impurities in natural gas can also be dissolved in crude oil.

Crude oil, and any crude oil distillate that is a stable liquid hydrocarbon at ambient temperature and pressure, such as gasoline, kerosene, jet fuel, diesel, or fuel oil, therefore provide maximum DNG storage capacity for natural gas, and importantly, are universally available storage media.

Classification of Crude Oil and Natural Gas

Petroleum occurs in six general forms in subterranean reservoirs at elevated temperature and pressure:

Heavy Oil
Black Oil
Volatile Oil
Retrograde Gas
Wet Gas
Dry Gas

"Crude oil", as referenced in this application, is defined as the liquid hydrocarbon that is stable at ambient pressure and temperature, which results from petroleum undergoing standard oilfield separation processes. Crude oil, as referenced in this application, does not result from distillation processes that generate products such as gasoline, kerosene, jet fuel, diesel, fuel oil, or non-aqueous drilling liquids.

Of the six types of petroleum listed above, the first five yield a hydrocarbon liquid that is a stable liquid at ambient temperature and pressure, after application of standard oilfield separation processes.

Dry Gas, as implied, yields only hydrocarbon gas at ambient temperature and pressure, no hydrocarbon liquid, and therefore could not serve as an LH.

Black Oil is the most common crude oil globally. Heavy Oil is comprised of higher proportions of high molecular weight hydrocarbons, compared to Black Oil, and comprises a significant share of global crude oil resources. Heavy oil is prevalent in countries such as Canada and Venezuela. Volatile oil is comprised of higher proportions of low molecular weight hydrocarbons, compared to Black Oil. Volatile Oil and Black Oil occur in many regions of the world, notably in the "Shale Oil" reservoirs of the U.S.

Retrograde Gas and Wet Gas are predominantly gas in subterranean reservoirs, but yield a stable liquid known as Condensate, at ambient conditions. Condensate is generated from retrograde and wet gases in many regions of the world, notably in shale oil reservoirs in the U.S.

Heavy Oil, Black Oil, Volatile Oil, or Condensate, comprise "crude oil", as referenced in this application. Crude oil may also be comprised of a mixture of any of these liquids.

The basic oilfield separation process referenced above is common, standard oilfield phase separation process achieved by bringing the subterranean fluid, via a well, to the surface, the conditions of which are always of lower temperature and pressure than that of the subterranean reservoir.

The decrease in temperature and pressure as a Heavy Oil, Black Oil or Volatile Oil flows up the well causes hydrocarbon gas to be released. This gas is called "associated gas". The decrease in temperature and pressure of a Retrograde Gas or Wet Gas as it flows in the well to the surface causes Condensate to evolve from the gas.

Once at the surface, the fluid is then directed through a large vessel called a separator. The separator decreases the velocity of the flowing gas and liquid mixture such that any crude oil—Heavy Oil, Black Oil, Volatile Oil, or Condensate—drops by buoyancy to the vessel bottom, to be directed to a storage tank at ambient temperature and pressure, or to another separator. Gas—Retrograde, Wet, Dry, or associated—is vented at the separator top, to be directed to a high-pressure gas pipeline for sale. Oilfield separation is often comprised of more than one separator, each successively taking the liquid hydrocarbon of the upstream separator, to progressively lower pressures and temperatures.

Dry Gas, Retrograde Gas, Wet Gas, or associated gas, comprise the "natural gas" that is to be transported by the process described in this application.

Volume Reduction of DNG

Relative to the LNG process, the volume reduction theoretically achieved by the DNG process is less, but is comparable to that of the CNG process.

The LNG process achieves an approximate 600-fold reduction in the gas volume through cryogenic liquefaction at ambient pressure. That is, 600 standard cubic feet (the volume at a specific ambient condition of pressure and temperature is referred to as standard cubic feet, or scf) of conditioned, fractionated natural gas may be reduced to a liquid volume of 1 cubic foot ($ft^3$), after liquefaction. This reduction quantity shall be termed "compression ratio". LNG has a compression ratio of 600 scf per $ft^3$.

Ambient temperature CNG compression ratio volume is dependent upon pressure and the gas composition. Ambient temperature DNG compression ratio is dependent upon the pressure, and compositions of both the natural gas and LH.

The following tables (Table II to Table IV) illustrate the LNG, CNG, and DNG compression ratios for various natural gases, and crude oil LH, at 70 F and 1000, 2000, and 3000 psia, compared to the approximate 600-fold reduction achieved with LNG at −260° F. and atmospheric pressure. The crude oil LH types include those derived from Heavy Oil, Black Oil, and Volatile Oil.

Compression ratios for Condensate are not presented in the tables as they are quite similar to that of Volatile Oil.

The crude oil LH types evaluated here are characterized by API gravity. API gravity is an index for the density of the crude oil—the higher the index, the lower the density. Table I shows the API gravities of the crude oil types chosen as LH examples.

TABLE I

| Crude oil type | ° API Gravity |
| --- | --- |
| Heavy Oil | 25 |
| Black Oil | 35 |
| Volatile Oil | 50 |

API gravity is also an indicator of molecular weight. The higher the API gravity, the lower the molecular weight.

The natural gases evaluated here are characterized by "gas gravity", which is the ratio of the molecular weight of the natural gas to the molecular weight of air.

The natural gases evaluated range from the lightest natural gas, methane, having a gas gravity of 0.57, to a heavy natural gas with a gas gravity of 0.85.

The DNG compression ratios in Tables II to IV are estimated with an equation of state model (SRK) developed in the petroleum engineering canon.

TABLE II

LNG at −260 F. and 14.7 psia, CNG and DNG at 70 F. and 3000 psia

| Natural Gas Gravity | LNG Compression Ratio | CNG Compression ratio | DNG Compression Ratio in Volatile Oil (50° API) | DNG Compression Ratio in Black Oil (35° API) | DNG Compression Ratio in Heavy Oil (25° API) |
| --- | --- | --- | --- | --- | --- |
| 0.57 (methane) | 617 | 237 | 162 | 111 | 79 |
| 0.65 | 598 | 254 | 184 | 127 | 91 |
| 0.75 | 571 | 277 | 223 | 155 | 112 |
| 0.85 | 545 | 295 | Gas | 199 | 144 |

TABLE III

LNG at −260 F. and 14.7 psia, CNG and DNG at 70 F. and 2000 psia

| Natural Gas Gravity | LNG Compression Ratio | CNG Compression ratio | DNG Compression Ratio in Volatile Oil (50° API) | DNG Compression Ratio in Black Oil (35° API) | DNG Compression Ratio in Heavy Oil (25° API) |
| --- | --- | --- | --- | --- | --- |
| 0.57 (methane) | 617 | 161 | 108 | 75 | 53 |
| 0.65 | 598 | 177 | 120 | 85 | 60 |
| 0.75 | 571 | 204 | 141 | 101 | 72 |
| 0.85 | 545 | 235 | 164 | 125 | 91 |

TABLE IV

LNG at −260 F. and 14.7 psia, CNG and DNG at 70 F. and 1000 psia

| Natural Gas Gravity | LNG Compression Ratio | CNG Compression ratio | DNG Compression Ratio in Volatile Oil (50° API) | DNG Compression Ratio in Black Oil (35° API) | DNG Compression Ratio in Heavy Oil (25° API) |
| --- | --- | --- | --- | --- | --- |
| 0.57 (methane) | 617 | 75 | 53 | 37 | 26 |
| 0.65 | 598 | 80 | 58 | 41 | 29 |
| 0.75 | 571 | 85 | 66 | 47 | 33 |
| 0.85 | 545 | 87 | 74 | 55 | 40 |

Tables II to IV indicate that the most effective crude oil type for DNG LH is Volatile Oil, as it has the highest compression ratios. This is because a Volatile Oil has a lower density than a lower API gravity Black Oil or Heavy Oil, as a consequence of having a higher proportion of lighter hydrocarbon components. This higher concentration of lighter components allows for a greater mass of natural gas, composed predominantly of the same lighter components, to establish gas-liquid phase equilibrium. For example, a 50° API volatile crude oil LH, receiving a 0.75 gravity natural gas, at 70° F. and 3000 psia, will possess a DNG compression ratio of 223 scf/$ft^3$.

In a tanker containing a 1 million barrel cargo volume, or 5.6 million $ft^3$, a compression ratio of 223 scf/$ft^3$ results in 1.2 billion scf of natural gas transported in the tanker, or 40% of a typical 3 billion scf LNG tanker cargo, in a typical 5 million $ft^3$ LNG tanker.

Note the "Gas" indication for Volatile Oil at 3000 psig and 0.85 gas gravity. This indicates the DNG mixture cannot remain a liquid at 3000 psig, but instead will become a gas.

Obviously this is undesirable, as DNG is intended to be liquid, and therefore this pressure is to be avoided for a mixture containing 50° API volatile crude oil LH, and 0.75 gravity natural gas, at 70° F. The pressure at which the liquid becomes gas is the "critical point pressure". This phenomenon is discussed further in a later section.

DNG compression ratios for LH comprised of distilled products of crude oil are indicated in Table V with the estimated values for gasoline, which is among the lightest of distilled products of crude oil, and therefore having the highest of compression ratios.

TABLE V

| Natural Gas Gravity | DNG Compression Ratio in Gasoline (58° API) at 3000 psig | DNG Compression Ratio in Gasoline (58° API) at 2000 psig | DNG Compression Ratio in Gasoline (58° API) at 1000 psig |
|---|---|---|---|
| 0.57 (methane) | 192 | 129 | 64 |
| 0.65 | 215 | 142 | 70 |
| 0.75 | Gas | 163 | 78 |
| 0.85 | Gas | 185 | 86 |

The compression ratios for gasoline in Table V were estimated with an equation of state model containing 68 hydrocarbon components, as well as with the SRK model, input with the calculated API of the gasoline, 58°. Good agreement was attained between the two models, verifying the efficacy of the SRK model.

Note that DNG cannot remain a liquid at 3000 psig and 0.75 and 0.85 gas gravities. 3000 psig exceeds the critical point pressures for gasoline mixed with these two natural gases.

LH Swell Factor

As mentioned previously, LH will expand, or "swell" upon natural gas dissolving in it. The LH swell factor, depends on oil and gas compositions, and pressure and temperature.

Swell factors for the LH and natural gas combinations considered in Tables II to V are presented in Tables VI to VIII. These values were estimated with the SRK model.

Table VI for example indicates that for 50° API volatile crude oil LH, receiving a 0.75 gravity natural gas, at 70° F. and 3000 psia, a swell factor of 2.5 will result. That is, 1 ft³ of 50° API crude oil will swell to 2.5 ft³ when 557 scf (2.5×223) of 0.75 gravity natural gas is dissolved into it at 70° F. and 3000 psia.

The 2.5 cubic foot of swelled crude is not a gassy, or frothy liquid. A free gas phase does not exist in it. It is 100% liquid.

Therefore, if 50° API crude oil is the LH, the cargo hold of the DNG marine transport vessel may initially be only 40% (1/2.5) filled with LH, prior to mixing with the 0.75 gravity natural gas to be transported. After mixing the 0.75 gravity gas and 50° API crude oil at 70° F. and 3000 psia, the cargo hold may be 100% full of DNG, due to swelling.

The proportion of the cargo hold volume that is comprised of LH alone, prior to mixing with natural gas, is therefore equal to the inverse of the swell factor.

TABLE VI

DNG Swell Factor at 70 F. and 3000 psia

| Natural Gas Gravity | Volatile Oil (50° API) | Black Oil (35° API) | Heavy Oil (25° API) | Gasoline (58° API) |
|---|---|---|---|---|
| 0.57 (methane) | 1.600 | 1.323 | 1.205 | 1.876 |
| 0.65 | 1.811 | 1.415 | 1.258 | 2.247 |
| 0.75 | 2.523 | 1.614 | 1.366 | 6.520 |
| 0.85 | Gas | 2.092 | 1.576 | Gas |

TABLE VII

DNG Swell Factor at 70 F. and 2000 psia

| Natural Gas Gravity | Volatile Oil (50° API) | Black Oil (35° API) | Heavy Oil (25° API) | Gasoline (58° API) |
|---|---|---|---|---|
| 0.57 (methane) | 1.332 | 1.199 | 1.131 | 1.444 |
| 0.65 | 1.408 | 1.244 | 1.160 | 1.547 |
| 0.75 | 1.558 | 1.329 | 1.213 | 1.763 |
| 0.85 | 1.777 | 1.480 | 1.302 | 1.862 |

TABLE VIII

DNG Swell Factor at 70 F. and 1000 psia

| Natural Gas Gravity | Volatile Oil (50° API) | Black Oil (35° API) | Heavy Oil (25° API) | Gasoline (58° API) |
|---|---|---|---|---|
| 0.57 (methane) | 1.139 | 1.090 | 1.061 | 1.178 |
| 0.65 | 1.162 | 1.105 | 1.071 | 1.204 |
| 0.75 | 1.198 | 1.130 | 1.089 | 1.249 |
| 0.85 | 1.238 | 1.167 | 1.113 | 1.266 |

DNG Critical Point Pressure

As mentioned previously, increased addition of natural gas to LH at increasing pressures and ambient temperature will eventually result in the mixture becoming 100% gas instead of 100% liquid. The pressure at which this occurs is called the critical point pressure of the mixture. The critical point pressure depends on the composition of the LH and natural gas. The critical point pressure is the maximum pressure at which DNG is viable.

Table IX provides the estimated critical point pressures for the LH and natural gas mixtures presented in Tables II through V. These were estimated using the SRK model.

The corresponding estimated compression ratios and swell factors corresponding to these critical point pressures, for the previously considered LH and natural gas mixtures, are presented in Tables X and XI. These compression ratios approximate the maximum achievable for DNG. These compression ratios could only be achieved if DNG tanker cargo holds would be capable of containing the critical point pressures in Table IX.

TABLE IX

DNG Critical Point Pressure (psia) at 70 F.

| Natural Gas Gravity | Volatile Oil (50° API) | Black Oil (35° API) | Heavy Oil (25° API) | Gasoline (58° API) |
|---|---|---|---|---|
| 0.57 (methane) | 5,425 | 9,407 | 13,322 | 4,306 |

TABLE IX-continued

DNG Critical Point Pressure (psia) at 70 F.

| Natural Gas Gravity | Volatile Oil (50° API) | Black Oil (35° API) | Heavy Oil (25° API) | Gasoline (58° API) |
|---|---|---|---|---|
| 0.65 | 4,540 | 7,576 | 10,538 | 3,732 |
| 0.75 | 3,562 | 5,726 | 7,856 | 3,054 |
| 0.85 | 2,864 | 4,232 | 5,792 | 2,730 |

TABLE X

DNG Compression Ratios at Critical Point Pressure (psia) and 70 F.

| Natural Gas Gravity | Volatile Oil (50° API) | Black Oil (35° API) | Heavy Oil (25° API) | Gasoline (58° API) |
|---|---|---|---|---|
| 0.57 (methane) | 314 | 365 | 401 | 283 |
| 0.65 | 305 | 347 | 377 | 281 |
| 0.75 | 294 | 328 | 350 | 277 |
| 0.85 | 286 | 310 | 328 | 276 |

TABLE XI

DNG Swell Factors at Critical Point Pressure (psia) and 70 F.

| Natural Gas Gravity | Volatile Oil (50° API) | Black Oil (35° API) | Heavy Oil (25° API) | Gasoline (58° API) |
|---|---|---|---|---|
| 0.57 (methane) | 4.277 | 4.174 | 4.344 | 3.769 |
| 0.65 | 5.073 | 4.687 | 4.811 | 4.603 |
| 0.75 | 6.651 | 5.501 | 5.428 | 6.704 |
| 0.85 | 8.882 | 6.552 | 6.186 | 7.975 |

The results in the tables above are summarized in Table XII, in which compression ratios and swell factors are presented for a "practical" DNG pressure, and 70 F. Here, the "practical" DNG pressure is assumed to be 3000 psia or lower. The basis for this pressure is the assumption that 3000 psia may represent an upper bound for the cargo hold pressure of a viable, large DNG tanker.

TABLE XII

Maximum "Practical" DNG Compression Ratios at 70 F.

| Natural Gas Gravity | Compression Ratio | LH ° API | Pressure psia | Swell Factor |
|---|---|---|---|---|
| 0.57 (methane) | 192 | 58 | 3000 | 1.876 |
| 0.65 | 215 | 58 | 3000 | 2.247 |
| 0.75 | 223 | 50 | 3000 | 2.523 |
| 0.85 | 286 | 50 | 2864 | 8.882 |

The Change in Natural Gas and LH Composition

When natural gas dissolves in LH at elevated pressure, and then subsequently comes out of solution from the LH due to a release of that elevated pressure, the natural gas contains hydrocarbon mass, taken from the LH, which did not exist in the original natural gas. For example, if the original natural gas is pure methane, and the LH is crude oil, the released natural gas will contain methane, ethane, propane, butane, pentane, hexane, and heptane. The gas in this example becomes significantly "heavier", gauged by its molecular weight.

The composition of the released natural gas depends on the composition of the original natural gas, the composition of the LH, the pressure of the DNG liquid mixture, and the conditions of pressure and temperature required at the regasification facility during the release of gas from the DNG liquid mixture. The composition change may be dramatic as in the methane/crude oil example described above, or it may be subtle and even too small to measure in the case of an original natural gas that contains many or all of the hydrocarbon components.

As the natural gas composition changes, so too does the composition of the LH—whatever components are gained by the natural gas, are lost by the LH. The change could be dramatic, as in the methane/crude oil example, for which the crude oil would lose some of its ethane through heptane components. The crude becomes "heavier" as its molecular weight has increased because it contains heavier components in higher proportions after it is depleted of its lighter components.

The practical impact of the change in natural gas composition is difficult to predict. The gas may increase in value if it contains heavier hydrocarbon components. However, if a destination market accepts only a lighter natural gas, and is not equipped to separate out the heavier components for sale, then the value of the released gas may be diminished.

The practical impact of the change in LH composition is that because it becomes heavier, its API gravity decreases, and so the DNG compression ratio decreases. A volatile oil, for example, may trend, over multiple shipments, toward the composition of a black oil, and Tables II through IV above show that compression ratio is decreased as a consequence. This degradation in compression ratio is unavoidable and can only be mitigated by replacement of the LH with a fresh supply of higher API gravity LH.

The DNG Process

According to an embodiment of the present invention, a process of transporting natural gas through solution in liquid hydrocarbon at ambient temperature generally includes the steps of liquefaction, shipping, and regasification of natural gas. These steps are described below; however, those of ordinary skill in the art will appreciate that in addition to the specific processes and equipment described below, some or all of the steps may be implemented by other means, including means that may be developed in the future.

Step S1: The natural gas to be transported offshore is piped to the loading port.

Step S2: The LH is piped or shipped to the same port, and is transferred to the DNG tanker, or to a mixing tank facility onshore. If the DNG tanker is returning from a previous DNG transport trip, the LH will reside in the tanker.

Step S3 (optional): The natural gas may be conditioned by dehydration and hydrogen sulfide removal at the loading port, prior to mixing with the LH. The tanker may also utilize corrosion protection for hydrogen sulfide.

Figure 2:
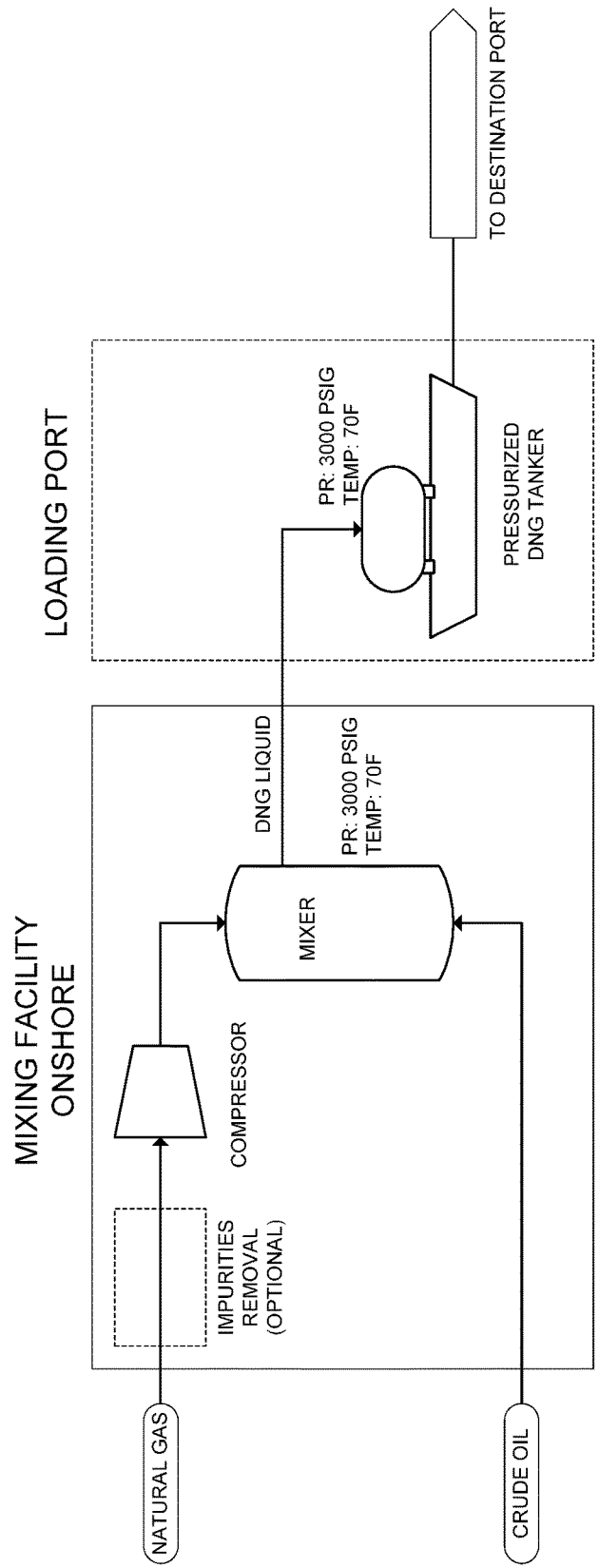
FIG. 2 schematically illustrates the process and equipment of mixing of natural gas and LH in a mixing facility onshore and subsequent loading of the DNG liquid to a DNG tanker according to another embodiment of the present invention.

Step S4: The natural gas and LH are mixed at ambient temperature and high pressure. The pressure is determined by the properties of the gas and crude and the desired compression ratio, and the pressure constraints of the facility. In preferred embodiments, the high pressure is in the range of 500-3500, and more preferably, in the range of 1000-3000. The compression ratios that can be achieved is generally in the range of 20 to 300. The mixing process may occur in the DNG tanker (FIG. 1), or in a mixing tank facility onshore (FIG. 2).

If the mixing occurs in the DNG tanker, the tanker will have been partially loaded with LH. The partial loading of LH is necessary to accommodate LH swelling, which is described in a section above. Under this alternative, the natural gas must first be stored in buffer storage tanks, before being piped and compressed into the DNG tanker. The volume of gas buffer tank storage and the duration of gas residency in the storage tank will be dependent upon the number of DNG tankers and transport duration. This buffer storage allows for a continual stream of natural gas into the loading port, while all tankers are at sea.

The number of tankers may be sufficient to not require buffer storage, that is, natural gas is continuously loaded onto tankers. It is likely however, that the number of tankers necessary for continual loading will not be cost efficient.

If the mixing occurs in a facility onshore, the DNG will reside in the mixing facility, awaiting loading onto the tanker. The volume and number of mixing facilities and the duration of DNG residency in the facilities will be dependent upon the number of DNG tankers and transport duration. This buffer storage in the mixing facilities allows for a continual stream of natural gas into the loading port while all tankers are at sea. Alternatively, the DNG may reside in buffer storage that is separate from the mixing facility.

The mixing process may be one of a variety of processes, including:

Compressing the gas into the LH such that the gas can be dissolved into the LH in the least amount of time and cost. This may be achieved for example by percolating the gas through the LH from the bottom of the mixing tank or DNG tanker. The time for which gas will dissolve in LH is dependent on the flux rate of phase change from gas to liquid, and the surface area of flux. The rate of dissolution in a dynamic system is difficult to predict given the large number of variables. However, the flux area is obviously maximized with bubbles of gas. Further, it is likely the bubbles will require circulation to prevent buoyancy segregation. Segregated gas will not dissolve in a reasonable time.

Compressing the gas into a holding tank (mixing tank) at the desired pressure and ambient temperature, and then pumping the LH into the holding tank in droplet or mist form. This method may be inefficient as despite the large area of flux generated with the misting of LH, insufficient circulation of the mist will leave volumes of gas unexposed to LH, leaving quite possibly large volumes of gas that will not be liquefied.

Step S5: Once the DNG tanker is loaded with high-pressure DNG liquid, it sails to the destination port.

Step S6: Upon arrival at the destination port, the DNG tanker is connected to a regasification facility where natural gas is released from the DNG.

The DNG regasification facility may resemble the production separation facility of a typical oil field, as indeed the cargo hold of an arriving DNG tanker may be analogous to a subterranean crude oil reservoir. That is, both may initially be in a single-phase liquid state at high pressure.

DNG regasification may follow the standard crude oil production and separation process. Crude oil in a subterranean reservoir flows into an oil well due to the high pressure in the reservoir, and a pressure gradient induced by opening a valve at the surface wellhead, into a low pressure system. The oil travels up the well to the surface, releasing natural gas in route as it continually decreases in pressure. Upon reaching the surface, the commingled oil and gas stream passes through a choke, which is used to control the rate of flow. The stream is then piped to an oil-gas separator, which is a vessel that, through its large diameter relative to the pipe, provides a significant decrease in the velocity of the stream. This allows natural gas to separate from the liquid crude in the vessel, due to buoyancy. The gas is piped from the top of the separator to an orifice-type meter which measures the gas volume. The gas is then piped to the sales point. The liquid oil phase is drained from the bottom of the separator, to a "stock tank" where the oil volume is measured. The crude oil is then transported to a refinery by pipe, truck, or rail.

The rate of flow from the reservoir continually decreases as the reservoir pressure depletes with continual removal of crude oil. Natural gas may evolve in the reservoir, and will slow the pressure decline, and therefore flow rate decline, to an extent.

Figure 3:
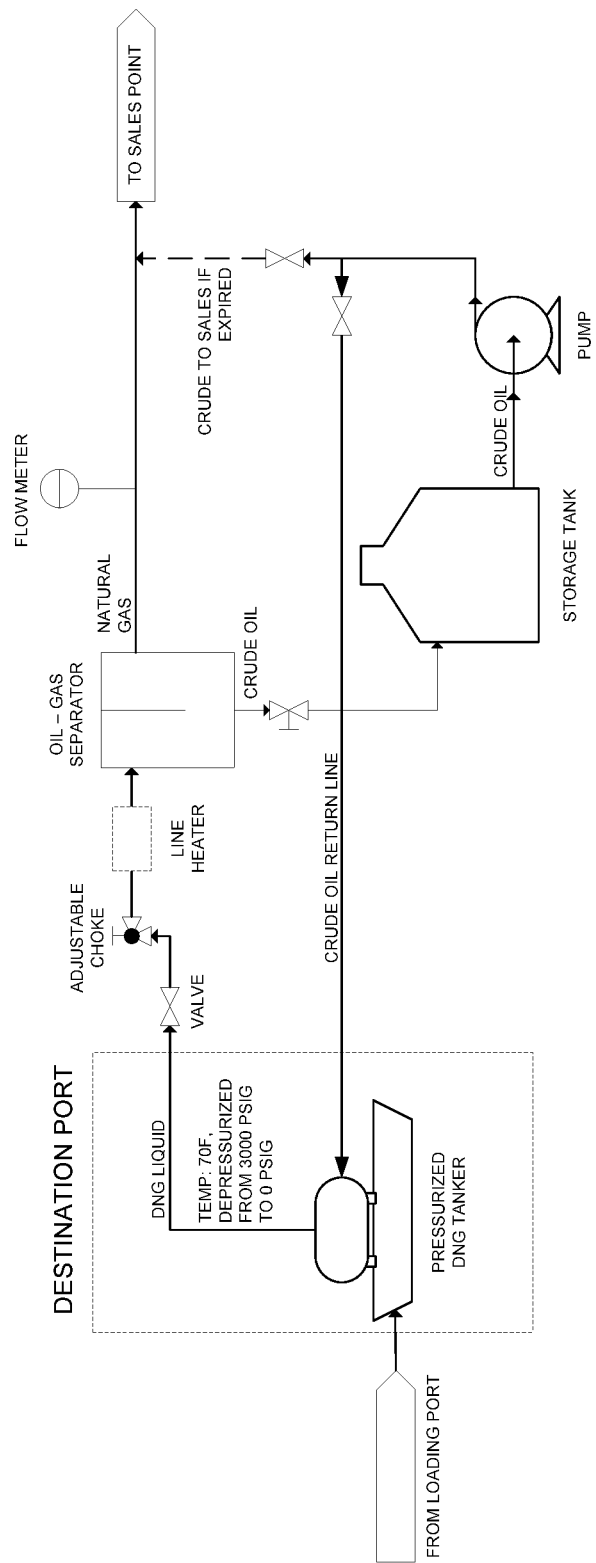
FIG. 3 schematically illustrates the process and equipment of regasification of natural gas by separation onshore according to an embodiment of the present invention.

The DNG regasification facility (FIG. 3) may be similar to the oil field production and separation facility, and may be implemented by those skilled in the relevant art without undue experimentation. Such a DNG regasification facility may not require a level of technical sophistication, or equipment cost, exceeding that of a conventional oil field facility. For example, the pressure rating of standard oil field production processing equipment is sufficient for estimated DNG pressures (3000 psig). The DNG cargo hold may be connected to a piping system (analogous to an oil well) that is fitted with a valve (analogous to a wellhead), a choke, and an oil-gas separator. Initially closed, the valve may be opened to allow the DNG liquid to flow from the cargo holds due to the high DNG pressure in the holds, and a pressure gradient induced by the opening of the valve into the lower pressure separator system, which may be comprised of one or more separator vessels. The choke may be adjusted to control the rate of flow into the separator system, to achieve an optimal rate for effective separation. The gas may be separated, measured, and piped to the sales point. The LH may be drained from the separator and piped to a stock tank.

As in a subterranean reservoir, natural gas will evolve from LH in the cargo hold as DNG is removed, due to pressure depletion in the hold. The evolved gas will maintain to some extent the pressure in the cargo hold, decreasing pressure depletion, and flow rate decline, to an extent.

The ambient temperature of the DNG tanker is likely to be significantly lower than the temperature of the subterranean reservoir, and this may present an increased risk of gas hydrate formation during regasification. A line heater may therefore be required to maintain a gas temperature above hydrate temperature. The greatest risk of hydrate formation will be at the choke, where the gas expansion cooling effect is maximum.

This process may continue until the pressure in the cargo hold diminishes to atmospheric pressure, at which point flow from the ship will cease. A residual volume of both LH and natural gas will remain in the cargo holds. The natural gas may be displaced with an inert gas to a flare system and burned, mitigating combustion risk in the cargo hold. The offloaded portion of LH in the onshore tank may then be piped back to the cargo holds of the ship where the sum of the residual and returned LH volumes may be measured.

As with the subterranean reservoir analogue, the rate of flow of offloading DNG will diminish as DNG pressure is depleted in the cargo hold, and as such, will result in extended offloading and regasification duration. Efficiency in regasification duration is desired to maintain the overall gas transport rate, which significantly impacts project economics. A variation of this regasification process that may alleviate offloading rate decline may include pumping water into the bottom of the DNG cargo hold such that the pressure in the cargo hold is maintained at the DNG pressure. The water will displace entirely the DNG cargo, at the DNG pressure. This variation in the offloading method will result in the offload rate being controlled by the water pump rate, with no rate decline. This variation will also result in no natural gas evolving in the cargo hold, minimizing combustion risk. Ship buoyancy of course must be maintained by some means as the water fills the cargo holds.

Figure 4:
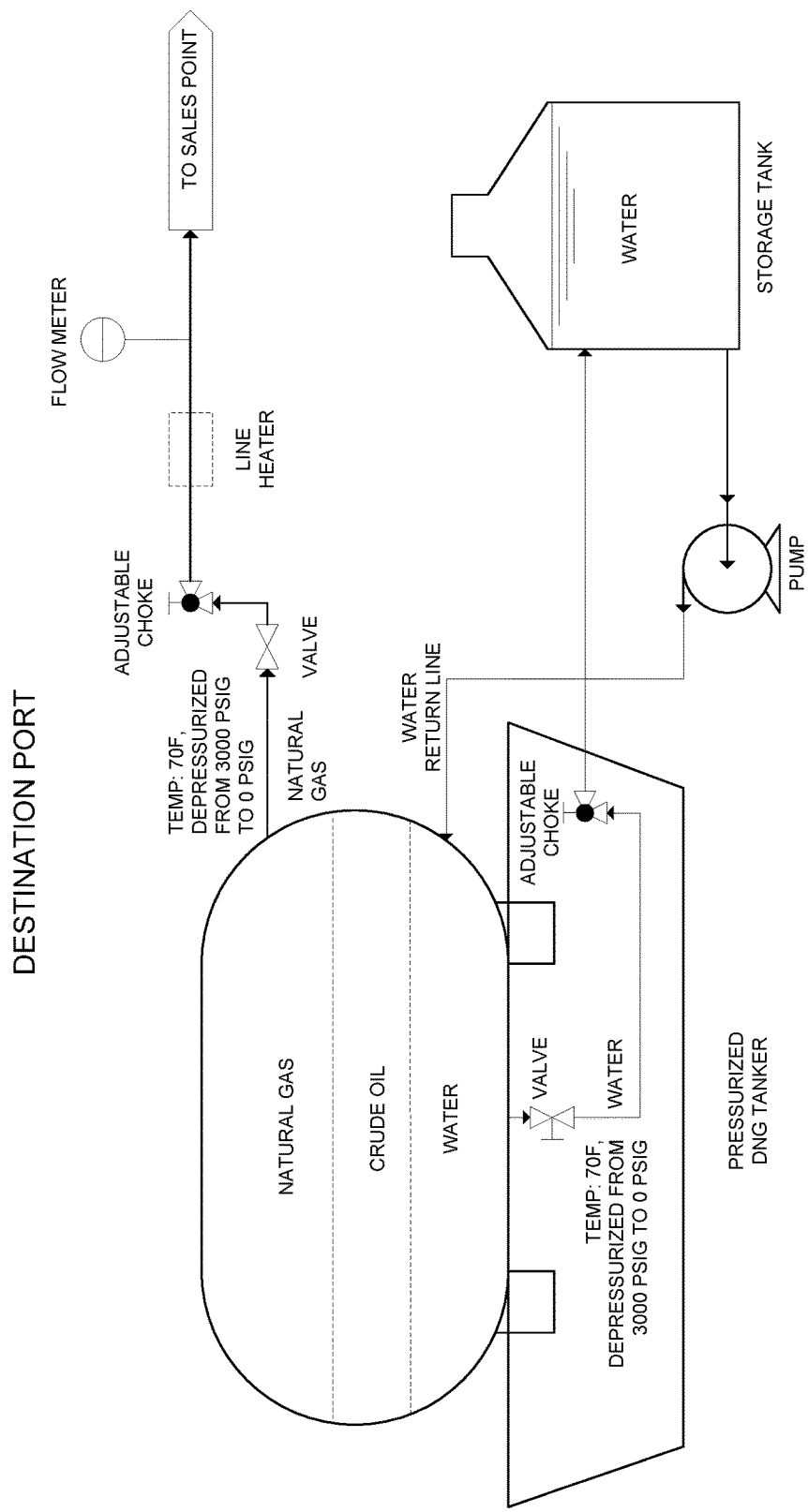
FIG. 4 schematically illustrates the process and equipment of regasification of natural gas in the DNG tanker according to another embodiment of the present invention.

Alternatively, an unloading process may be designed in which only the re-gasified natural gas flows from the tanker (FIG. 4), rather than DNG as described above. This alternative would therefore require only gas production facilities, as opposed to oil and gas production and separation facilities required for the alternative above. The gas-only regasification facilities may therefore be less complex and less expensive. This natural gas only unloading may be possible for example if a volume of water is included with the LH in the cargo holds before mixing of natural gas (or before the DNG is loaded into the tanker if mixing occurs onshore), at the loading port. After loading DNG, the ship cargo holds will then contain a pressured two-phase system of water and DNG. As DNG and water are immiscible, the two phases will remain separated, with no mixing, and with the water residing entirely under the LH, due to buoyancy, on the bottom of the cargo hold.

Upon arrival at the unloading port, a discharge pipe connection on the ship, located below the cargo hold DNG-water interface, may be connected to an unloading facility, consisting simply of a piping system fitted with a valve, a choke, and a water storage tank. Drainage of water will then commence with opening of the valve, and flow rate controlled by the choke. The water will be piped to the water storage tank. When a majority of the water has been drained, the valve will be closed and water drainage ceased.

Draining the water releases pressure from the cargo holds, and allows natural gas to come out of solution from the DNG. The gas will form a "cap" on top of the DNG, and can then be piped off of the top of the cargo hold, through a choke controlling its flow rate, through an orifice type meter to measure its volume, and to the sales point. Once gas flows from the cargo hold, pressure is further released, allowing more gas to come out of solution and into the gas cap. The gas production process may include a line heater near the choke, to prevent hydrate formation in the gas, since the ambient temperature gas released from the DNG will have a tendency to be cooled below hydrate formation temperature due to expansion cooling at the choke.

Eventually, all gas will be released from the DNG and piped to sales, and the LH volume will remain. Water will then be piped back to the cargo holds, where it will be dumped into the LH, settling to the bottom of the cargo hold, to be in place during the next DNG loading.

This gas-only alternative offloading method possesses the same rate depletion disadvantage as the first method described above, as the natural gas flow rate from the cargo holds diminishes with depleting DNG pressure in the holds. Diminishing rate extends the duration of regasification.

Step S7: Under any unloading alternative, the compositions of the separated LH and gas may be measured. The gas composition may be measured during the unloading process to determine its market sales value, as the composition will differ from the composition of the natural gas piped to the unloading port and liquefied to DNG, as discussed in a section above. The composition of the LH may be measured to determine its capacity for DNG, that is, the DNG compression ratio, as the compression ratio decreases with each DNG shipment, due to API gravity decrease. If the compression ratio is not sufficient, the LH may be piped to stock tanks, where it may await transport to a refinery for sale.

Step S8: The DNG tanker sails with or without LH in its cargo holds, to either a port to load fresh LH, or to return to the natural gas loading port to load another shipment of DNG.

As alluded to above, the LH is progressively depleted of its lighter components as it transports multiple shipments of DNG, and will eventually likely need to be replaced with a fresh LH supply, as it will be diminished of its DNG compression ratio capacity. The depleted LH volume may be sold to defray the cost of the fresh volume, however there would necessarily be a financial loss incurred, as the depleted LH will have a lower market sales value than the newly purchased fresh crude. This loss would be a regular operating cost associated with the DNG process.

U.S. Crude Oil and Natural Gas Export Regulatory Impact

U.S. federal regulations controlling the export of crude oil and natural gas will have a significant impact on the feasibility of DNG, LNG, and CNG.

The U.S. was the world's top oil producer and consumer in 2014, with 13% share of global production, and 20% share of consumption. While a net crude oil importer, increasing volumes of U.S. crude oil production are stranded due to inadequate refining and pipeline capacities.

U.S. crude oil exports are governed by Section 103 of the 1975 Energy Policy and Conservation Act. The governing crude oil export control agency, the Bureau of Industry and Security, of the U.S. Department of Commerce, clarified the export policy in December 2014. The existing regulations (EAR 754.2) state that an export license is required for crude oil, " . . . defined as a mixture of hydrocarbons that existed in liquid phase in underground reservoirs and remains liquid at atmospheric pressure after passing through surface separating facilities and which has not been processed through a crude oil distillation tower. Included are reconstituted crude petroleum, and lease condensate and liquid hydrocarbons produced from tar sands, gilsonate, and oil shale. Drip gases are also included, but topped crude oil, residual oil, and other finished and unfinished oils are excluded."

Export licenses have been granted to crude oils such as those of the Alaska North Slope and Cook Inlet, and California heavy oil, and others. No export license has otherwise been granted for the majority of crude oil produced in the U.S., under the Act.

On Dec. 18, 2015, Section 103 of the Act was repealed by the U.S. Congress. U.S. crude oil export does not therefore presently require export licensing, and is otherwise not prohibited by any U.S. law. The first international export shipment of crude oil from a U.S. port following the repeal occurred Dec. 31, 2015.

Any natural gas, including LNG and CNG, requires U.S. export licensing. The 1938 Natural Gas Act prohibits export or import of natural gas without both, the approval of the U.S. Department of Energy (DOE), and a facilities environmental impact review by the Federal Energy Regulatory Commission (FERC). Since 2010, 35 applications for export licenses have been received by the DOE, and 9 have been approved, 6 conditionally. The first LNG export is expected to occur in 2016.

DNG with LH that is a crude oil distillate such as gasoline, kerosene, jet fuel, diesel, or fuel oil will certainly not be prohibited from export, as indeed crude oil distilled products are a major U.S. export commodity. The U.S. was the top refiner of crude oil products in 2014 with 20% of global share, and one-quarter of that was exported. Despite historically not exporting crude oil, the U.S. is a leading liquid hydrocarbon exporter, accounting for 7% global share, due to its crude oil distilled products exports.

LH, per se, that is either crude oil or a crude oil distillate will therefore not be prohibited by law from export. However, it is uncertain how prohibitive DOE and FERC licensing regulations will be for DNG export, with respect to the natural gas component of DNG, assuming they have authority over such. If DNG is regarded by law as either a crude oil or a crude oil distillate, then DNG export will not be prohibited.

Economic Feasibility

Comparison to CNG

Marine transport of CNG was first, and last, accomplished in 1965, with a ship having 1.3 MMscf natural gas cargo capacity. The project was abandoned shortly after launch due to low gas price.

Since that first CNG venture, definitive marine CNG transport economic feasibility has yet to be established, as no CNG projects have followed, to date, although land transport of CNG has proven viable over that 50-year period.

Proposed marine transport CNG projects are presently designed for small to moderate gas volumes and shipping distances: less than 600 MMscf/d projects, and 500-2000 miles.

The average LNG tanker holds the liquid form of 3 billion scf of natural gas, while a proposed large CNG tanker holds the compressed gas form of 0.5 billion scf of natural gas. This arises from a typical cargo volume of an LNG tanker of 5 million cubic feet, and that of a proposed large CNG vessel, 2 million cubic feet. As LNG cargo size is therefore 2.5 times larger than CNG, and the compression ratio is 2.4 times larger, assuming a CNG compression ratio of 250 and LNG compression ratio of 600, the resulting LNG shipping volume advantage is a multiple of 6 (2.5×2.4), as described above, 3 billion vs. 0.5 billion scf. Six CNG ships are therefore required in this example to transport the same volume of gas as one LNG tanker.

Other proposed CNG natural gas cargo sizes are 10% to 50%, depending on the novel technology proposed, that of a typical LNG cargo size, 3 billion scf. As illustrated above, a proportionally larger fleet of CNG ships would therefore be required for any given project, to transport natural gas at the same volume delivery rate as LNG.

The proposed CNG capital cost presently cannot support the larger fleet. Smaller fleets, as required by smaller natural gas volume delivery rates, and/or shorter transport distances, may be economic.

80-90% of the capital cost of a CNG project is in ship construction, due to the novel technology required for lightweight, high-strength gas containment vessels. Therefore, despite the capital cost savings in unnecessary cryogenic and refrigeration equipment, CNG cannot compete economically with LNG for large natural gas delivery rates, or over large transport distances, because of high ship construction costs.

Proposed CNG project costs of conditioning and compression facilities are estimated to be $30-60 MM, unloading facilities $20-60 MM, and the majority cost, ship construction, $250 MM per ship. The total cost is estimated to be $0.3-2 billion, depending on the number of ships proposed for the project, which depends on the gas volume delivery rate and round-trip voyage time.

DNG shipping economics will be similarly challenged as CNG, given that compression ratios for DNG are similar to or lower than that of CNG. Also, conditioning and compression capital costs, as well as regasification facility capital costs, may be similar to those proposed for CNG.

However, the fundamental difference between CNG and DNG cargos, that CNG is gas and DNG is liquid, may prove important. If a technology is developed that enables the construction of safe, large, pressurized liquid-carrying vessels, safer and larger than gas-carrying vessels, then DNG transport may become economic relative to CNG.

For example, a typical crude oil tanker cargo volume is 1 million barrels, or 5.6 million cubic feet. For a DNG compression ratio of 223, from an example given above, a volume of natural gas of 1.2 billion scf could be transported, if the crude oil tanker could be feasibly modified such that its cargo hold could withstand 3000 psia of internal liquid pressure at temperature 70 F. This volume is less than ½ of the volume shipped by LNG, however it is more than double the typical volumes proposed for CNG projects.

This example is arbitrary—a typical crude oil tanker may or may not be feasibly retrofitted for high internal liquid pressure, and a vessel that may eventually be feasible in transporting DNG at high liquid pressure may be larger or smaller than 1 million barrels. If however, a 2 million+ barrel DNG tanker at high liquid pressure may be feasibly constructed, than the transported volumes of natural gas by DNG will approach that of LNG.

Like CNG, it is anticipated that the large majority of the DNG project capital cost will be comprised of the marine vessel construction cost, given the pressure and size requirements, and the relatively low estimated costs for DNG loading and regasification facilities, described in the next section. These facilities may not require technology or scope outside what is available in conventional oilfield gas injection and production projects.

Comparison to LNG

The economic feasibility of DNG may be cursorily examined by comparing it to that of the current commercially proven, LNG method. A current nominal capital cost of LNG infrastructure is $5 billion. Typically, 50% of this cost is comprised of the liquefaction facilities, 40% marine vessel, and 10% regasification facilities. As many LNG projects globally are operating and planned, it is safe to assume most of these projects are economic, under current low natural gas feed stock prices, and the price premium LNG operators charge to LNG customers.

The economic return to LNG operators may be partly quantified by time to breakeven, that is, the point at which cumulative revenue defrays the capital investment, which may in turn be cast as number of deliveries to breakeven. The smaller the number of deliveries to breakeven, the greater the economic return. If the feasibility of DNG is defined as an equivalent number of breakeven deliveries to that of LNG, then a simple analysis is possible in which only a comparison of delivery size is required.

Following a previously described example, for a DNG tanker containing a 1 million barrel cargo volume, or 5.6 million ft$^3$, a DNG compression ratio of 223 scf/ft$^3$ results in 1.2 billion scf of natural gas transported in the tanker, or 40% of a typical 3 billion scf LNG tanker cargo, in a typical 5 million ft$^3$ LNG tanker.

As the DNG shipment size in this example is 40% of a typical LNG shipment size, the maximum allowable DNG capital cost must be 40% of the typical $5 billion LNG capital cost, or $2 billion, in order for breakeven to occur in the same number of shipments.

If DNG onshore compression facilities and tanker capital costs can be limited to $2 billion for this example, then it is reasonable to speculate that DNG economic viability would be similar to that of LNG.

This $2 billion DNG capital cost must be sufficient for the DNG construction and equipment scope, including that required to bring a 1 million barrel, 3000 psig liquid tanker into service.

The example above results in a DNG project that is 40% of the scale of the LNG project, that is, it will transport only 40% of the gas rate of the LNG project. If the gas transport rate is to be the same as that of the LNG project, the DNG project will require a marine tanker fleet that is 2.5 times larger than the LNG marine tanker fleet. $5 billion in capital investment must therefore include this larger DNG fleet if the DNG project is to have equivalent economics to the LNG project. If the DNG capital cost is less than $5 billion, including the larger fleet, then DNG will compete favorably with LNG.

As DNG onshore loading and regasification facilities will not require cryogenic equipment or power, or gas conditioning or fractionation equipment, and instead will likely require currently available conventional oilfield compression and production facilities and technology, it is reasonable to assume that the capital cost of onshore DNG facilities could be significantly lower than that of LNG. The capital cost of a DNG tanker may be quite large, however, as large, pressured liquid tankers currently do not exist. Containment of DNG tanker construction costs may therefore be an important aspect of DNG economic feasibility.

The DNG tanker size that achieves a delivery size equivalence to a typical LNG tanker is that which contains a cargo volume of 2.5 million barrels. If the DNG capital cost, including the cost to build such a tanker fleet, is less than $5 billion, then DNG will compete favorably with LNG.

Although DNG loading and regasification equipment may not require improved technology relative to conventional oil and gas production equipment, it may require an enlargement of scale compared to a conventional oil and gas production facility. An LNG regasification facility can unload an LNG tanker in less than 1 day, which is a 3 billion scf gas per day unloading rate. This would require a DNG liquid unloading rate of 1 million stock tank barrels per day of LH, in addition to 3 billion scf per day of natural gas, both of which presently are rare production rate magnitudes in the oil industry. This assumes that the 2.5 million barrels of DNG has a swell factor of 2.5, such that when the natural gas is released from the DNG, 1 million stock tank barrels of LH will result.

A production facility capable of 100,000 stock tank barrels of oil per day, or 1 billion scf per day is not uncommon in the oil industry however, which would result in a 10-day unloading period for a 2.5 million barrel DNG tanker.

One alternative DNG regasification process described above is such that the LH remains in the DNG tanker, while the natural gas alone is vented from the tanker. The DNG regasification facility for this process may be comprised of conventional natural gas production equipment only, which would entail lower capital costs than a facility comprised of conventional crude oil production and separation equipment. Further, conducting 3 billion scf of natural gas in one or more days is not beyond the current capabilities of large gas field production facilities.

Another element of DNG capital investment will be the cost of LH stock. Under the scenario by which a 1 million barrel tanker is utilized as a DNG tanker, and 40% of the cargo volume is filled with crude oil LH, to account for a swell factor of 2.5, then at $30 per barrel LH price, the cost of the crude volume would be $12 MM. This is less than 0.6% of the estimated feasible total cost of $2.2 billion, described above.

Larger tankers, which are likely favorable to DNG economics, would increase the LH stock cost, proportional to the increase in cargo volume. For example, a 2.5 million barrel DNG tanker, described above, would require a $30 MM crude oil capital investment, at $30 per barrel crude oil price.

If the LH cargo is to be used in multiple trips, rather than released and sold on the first trip to the destination port, this investment would be recovered at the end of the DNG project life, when the LH is sold for the final time, at the LH market price, and no fresh replacement LH is procured. The sale proceeds would have a net present salvage value dependent on the time duration, and LH price movement, between purchase and sale.

It will be apparent to those skilled in the art that various modification and variations can be made in the natural gas transportation method and related apparatus of the present invention without departing from the spirit or scope of the invention. Thus, it is intended that the present invention cover modifications and variations that come within the scope of the appended claims and their equivalents.

What is claimed is:

1. A process of transporting natural gas, comprising:
   providing a hydrocarbon liquid, the hydrocarbon liquid being a stable liquid at ambient temperatures and ambient pressures;
   mixing the natural gas with the hydrocarbon liquid at an ambient temperature and a high pressure to generate a liquid mixture, the liquid mixture being a liquid containing the natural gas dissolved in the hydrocarbon liquid; and
   transporting the liquid mixture using a marine tanker from a first location to a second location, during which the liquid mixture is maintained at ambient temperature and the high pressure.

2. The process of claim 1, wherein the hydrocarbon liquid is crude oil.

3. The process of claim 1, wherein the hydrocarbon liquid is a distillate of crude oil.

4. The process of claim 1, wherein the mixing step mixes more than 20 volumes of the natural gas into one volume of the hydrocarbon liquid.

5. The process of claim 1, wherein the high pressure is above 1000 psia.

6. The process of claim 1, further comprising: prior to the mixing step, conditioning the natural gas, including dehydration and hydrogen sulfide removal.

7. The process of claim 1, wherein the mixing step occurs in the marine tanker.

8. The process of claim 1, wherein the mixing step occurs in a buffer storage tank, wherein the process further comprises loading the liquid mixture from the buffer storage tank to the marine tanker.

9. The process of claim 1, wherein the mixing step comprises:
   loading a volume of the hydrocarbon liquid into a mixing tank at ambient temperature; and
   percolating the natural gas at high pressure through the hydrocarbon liquid from a bottom location of the mixing tank, and circulating the mixture to prevent gas/hydrocarbon liquid segregation.

10. The process of claim 9, wherein the mixing tank is the marine tanker or a buffer storage tank.

11. The process of claim 1, wherein the mixing step comprises:
   compressing the natural gas into a mixing tank at ambient temperature; and pumping the hydrocarbon liquid at high pressure into the mixing tank in droplet or mist form.

12. The process of claim 11, wherein the mixing tank is the marine tanker or a buffer storage tank.

13. The process of claim 1, wherein in the mixing step, a volume reduction ratio of natural gas dissolved in the hydrocarbon liquid at a given pressure at the ambient temperature is lower than a volume reduction ratio of the same natural gas when the natural gas is applied with the same given pressure at the same ambient temperature.

14. A process of transporting natural gas, comprising:
   transporting a liquid mixture using a marine tanker from a first location to a second location, the liquid mixture being a mixture of the natural gas with a hydrocarbon liquid maintained at an ambient temperature and a high pressure, wherein the hydrocarbon liquid is a stable liquid at ambient temperatures and ambient pressures, wherein the liquid mixture is a liquid containing the natural gas dissolved in the hydrocarbon liquid, and wherein during the transporting the liquid mixture is maintained at the ambient temperature and the high pressure; and
   at the second location, releasing a gas from the liquid mixture by lowering the pressure of the liquid mixture.

15. The process of claim 14, wherein the high pressure is above 1000 psia.

16. The process of claim 14, wherein the releasing step includes a degasification step which comprises:
   directing the liquid mixture from the marine tanker to one or more oil-gas separators via a piping system, wherein the separators are at ambient temperature and sequentially lower pressures than the pressure in the marine tanker, and wherein the liquid mixture separates into the gas and a liquid in the separators, the liquid being a hydrocarbon liquid at ambient pressure and temperature; and
   piping the gas and the liquid out of the separators.

17. The process of claim 14, further comprising, prior to the transporting step, loading a volume of water in the tanker, wherein the releasing step includes a degasification step which comprises:
   draining some or all of the water from the tanker, wherein the gas is separated from the liquid mixture into a gas cap space created by draining of the water; and
   piping only the gas out of the marine tanker while the gas continually fills the gas cap space, eventually leaving a liquid hydrocarbon in the marine tanker, the liquid being a hydrocarbon liquid at ambient pressure and temperature.

18. The process of claim 14, wherein the releasing step includes a degasification step which comprises:
   pumping water into the bottom of the tanker cargo holds and displacing the liquid mixture from the holds while maintaining high pressure in the holds; and
   directing the liquid mixture from the tanker to one or more oil-gas separators via a piping system, wherein the separators are at ambient temperature and sequentially lower pressures than the pressure in the marine tanker, and wherein the liquid mixture separates into a gas and a liquid in the separators, the liquid being a hydrocarbon liquid at ambient pressure and temperature; and
   piping the gas and the liquid out of the separators.

19. The process of claim 14, wherein in the liquid mixture, a volume reduction ratio of natural gas dissolved in the hydrocarbon liquid at a given pressure at the ambient temperature is lower than a volume reduction ratio of the same natural gas when the natural gas is applied with the same given pressure at the same ambient temperature.

* * * * *